United States Patent
Vaidya

(10) Patent No.: US 7,132,649 B2
(45) Date of Patent: Nov. 7, 2006

(54) WEIGHTED NOISE COMPENSATING METHOD AND CAMERA USED IN MILLIMETER WAVE IMAGING

(76) Inventor: Nitin M. Vaidya, 632B Warren Wright Rd., Belchertown, MA (US) 01007

( * ) Notice: Subject to any disclaimer, the term of this patent is extended or adjusted under 35 U.S.C. 154(b) by 38 days.

(21) Appl. No.: 11/007,047

(22) Filed: Dec. 8, 2004

(65) Prior Publication Data

US 2006/0006322 A1   Jan. 12, 2006

Related U.S. Application Data

(63) Continuation of application No. 10/355,393, filed on Jan. 31, 2003, now Pat. No. 6,870,162.

(51) Int. Cl.
*G01N 21/01* (2006.01)
*G01S 7/497* (2006.01)

(52) U.S. Cl. .................. 250/252.1; 342/22; 342/179

(58) Field of Classification Search ............ 250/252.1, 250/336.1, 330, 341.1; 342/22, 179, 351
See application file for complete search history.

(56) References Cited

U.S. PATENT DOCUMENTS

| | | |
|---|---|---|
| 3,784,899 A | 1/1974 | Chalfin |
| 3,946,385 A | 3/1976 | Ewen |
| 3,975,736 A | 8/1976 | Ewen et al. |
| 4,041,494 A | 8/1977 | Ewen et al. |
| 4,122,344 A | 10/1978 | Lettington et al. |
| 4,413,878 A | 11/1983 | Lettington |
| 4,593,317 A * | 6/1986 | Heydlauff .................. 348/442 |
| 4,733,072 A | 3/1988 | Lettington |
| 4,901,084 A | 2/1990 | Huguenin et al. |
| 4,910,523 A | 3/1990 | Huguenin et al. |
| 4,940,986 A | 7/1990 | Huguenin |
| 5,047,783 A | 9/1991 | Hugenin |
| 5,073,782 A | 12/1991 | Hugenin et al. |
| 5,170,169 A | 12/1992 | Stephan |
| 5,202,692 A | 4/1993 | Hugenin et al. |
| 5,227,800 A | 7/1993 | Hugenin et al. |
| 5,455,589 A | 10/1995 | Hugenin et al. |
| 5,745,082 A | 4/1998 | Alder |
| 5,760,397 A | 6/1998 | Hugenin et al. |
| 5,789,622 A | 8/1998 | Quon et al. |

(Continued)

OTHER PUBLICATIONS

Hugenin, et al., *Contraband Detection Through Clothing By Means of Millimeter-Wave Imaging*, SPIE—The International Society for Optical Engineering, Underground and Obscured Object Imaging and Detection, vol. 1942, Apr. 15-16, 1993, pp. 117-128.

(Continued)

*Primary Examiner*—Otilia Gabor
(74) *Attorney, Agent, or Firm*—Brown Raysman Millstein Felder & Steiner

(57) ABSTRACT

Unpredictable response variations of the output value signals from radiometer or receiver channels due to noise are minimized when composing a millimeter wave image. The image is composed from composition signals which are each related to the corresponding output value signals from the channels. Some composition signals are weighted by a weighting factor which is different from a weighting factor used for weighting other composition signals. Preferably, the reciprocal of the standard deviation of variations of the output value signals from each channel is used as the weighting factor for deriving the composition signals from the output value signals from that channel. The intensity of each pixel of the image is composed by adding the weighted composition signals associated with that pixel.

40 Claims, 4 Drawing Sheets

U.S. PATENT DOCUMENTS

| | | | |
|---|---|---|---|
| 5,828,344 | A | 10/1998 | Alder et al. |
| 6,154,174 | A | 11/2000 | Snider et al. |
| 6,259,414 | B1 | 7/2001 | Lettington |
| 6,274,869 | B1 | 8/2001 | Butler |
| 6,353,224 | B1 | 3/2002 | Sinclair et al. |
| 6,900,756 | B1* | 5/2005 | Salmon .................. 342/351 |
| 6,937,182 | B1* | 8/2005 | Lovberg et al. ............ 342/22 |

OTHER PUBLICATIONS

G. Richard Hugenin, *The Detection of Concealed Weapons, Explosives and Other Contraband with Passive Millimeter Wave Imaging Cameras*, Sep. 1997, pp. 1-15.

Millitech, Microwaves & RF Brochure, Jul. 1992.

Stephen, et al., *Quasioptical Millimeter-Wave Hybrid and Monlithic PIN Diode Switches*, IEEE Transactions on Microwave Theory and Techniques, vol. 41, No. 10, Oct. 1993, pp. 1791-1798.

Lettington, et al., *Nonuniformity Correction and Restoration of Passive Millimeter-Wave Images*, Optical Engineering, vol. 40, No. 2, Feb. 2001, pp. 258-274.

Gleed, et al., *Operational Issue for Passive Millimeter Wave Imaging Systems*, SPIE—The International Society for Optical Engineering, Passive Millimeter-Wave Imaging Technology, vol. 3064, Apr. 21-22, 1997, pp. 23.33.

Hugenin, *Millimeter-Wave Video Rate Imagers*, SPIE—The International Society for Optical Engineering, Passive Millimeter-Wave Imaging Technology, vol. 3064, Apr. 21-22, 1997, pp. 34.45.

Pergande, et al., *Concealed Weapons Detection Sensor and Signal Processing Demonstration*, SPIE—The International Society for Optical Engineering, Passive Millimeter-Wave Imaging Technology, vol. 3064, Apr. 21-22, 1997, pp. 46-53.

Salmon, et al., *Absolute Temperature Stability of Passive Imaging Radiometers*, SPIE—The International Society for Optical Engineering, Passive Millimeter-Wave Imaging Technology, vol. 3064, Apr. 21-22, 1997, pp. 110-120.

Lettington, et al., *A New High-speed Method for Super-Resolving Passive Millimeter-wave Images*, SPIE—The International Society for Optical Engineering, Passive Millimeter-Wave Imaging Technology, vol. 3064, Apr. 21-22, 1997, pp. 218-226.

Anderton, et al., *Real Time Passive MM-wave Imaging*, SPIE The International Society for Optical Engineering, Passive Millimeter-Wave Imaging Technology II, vol. 3378, Apr. 13, 1998, pp. 27-33.

Lettington, et al., *Nonuniformity Correction and Restoration of Passive MM-wave Images*, SPIE—The International Society for Optical Engineering, Passive Millimeter-Wave Imaging Technology III, vol. 3703, Apr. 7, 1999, pp. 167-174.

Gao, et al., *Optimal Dithering of Focal Plan Arrays in Passive Millimeter-Wave Imaging*, SPIE—The International Society for Optical Engineering, Passive Millimeter-Wave Imaging Technology IV, vol. 4032, Apr. 26, 2000, pp. 124-133.

Lettington, et al., *Restoration Techniques for Millimeter-Wave Images*, SPIE—The International Society for Optical Engineering, Passive Millimeter-Wave Imaging Technology V, vol. 4373, Apr. 19, 2001, pp. 94-104.

* cited by examiner

WEIGHTED NOISE COMPENSATING METHOD AND CAMERA USED IN MILLIMETER WAVE IMAGING

CROSS-REFERENCE TO RELATED APPLICATION

This application is a continuation of U.S. patent application Ser. No. 10/355,393, filed Jan. 31, 2003, now U.S. Pat. No. 6,870,162 which is related to U.S. patent applications for an invention for a Baseline Compensating Method and Camera Used in Millimeter Wave Imaging, Ser. No. 10/355,736, and for an Offset Drift Compensating Flat Fielding Method and Camera Used in Millimeter Wave Imaging, Ser. No. 10/355,445, all of which are assigned to the assignee of the present application. The subject matter of these related applications are incorporated herein by this reference.

FIELD OF THE INVENTION

This invention generally relates to millimeter wave imaging. Millimeter wave imaging involves creating an image of a scene from millimeter wavelength energy signals emanating from the scene. More particularly, the present invention relates to a new and improved method and camera which compensates for the random and unpredictable effects of noise in output value signals supplied by each of a plurality of radiometer channels or receiver channels which receive and detect millimeter wavelength energy signals emanating from a scene. By compensating for the random and unpredictable noise, the individual and particular differences in response of each channel are more accurately compensated to improve the contrast and quality in an image composed by summing the compensated output value signals from the channels.

BACKGROUND OF THE INVENTION

Millimeter waves are electromagnetic radiation characterized by wavelengths in the range of from 1 to 10 millimeters and having corresponding frequencies in the range of 300 GHz to 30 GHz. Millimeter waves have the capability of passing through some types of objects which would stop or significantly attenuate the transmission of electromagnetic radiation of other wavelengths and frequencies. For example, millimeter waves pass through clothing with only moderate attenuation, pass through doors and walls, are capable of penetrating slight depths of soil, and are not obscured or adversely influenced by fog, cloud cover and some other types of visually-obscuring meteorological conditions. Because of these properties, millimeter wave imaging has been employed to detect contraband and weapons concealed beneath clothing of an individual, to alert law enforcement authorities of the location of individuals and objects within the interior of a room or building prior to executing search warrant raids, to detect the presence and location of buried land mines, and for landing and takeoff guidance for aircraft when meteorological conditions obscure runways, among many other things.

According to known laws of physics, the amount or intensity of electromagnetic energy emitted by an object is proportional to its physical temperature measured in degrees Kelvin. The radiation originates from thermally-induced charged-particle accelerations, subatomic particle interactions and other quantum effects. These quantum effects account for a distribution of radiation throughout a broad spectrum of frequencies, as recognized by Planck's Law. Consequently, it is typical to characterize the amount of energy emanating from a point or object in a scene by its apparent brightness temperature.

The energy emanating from a point or object in the scene results from emission and reflection. Emission and reflection are related to one another such that highly emissive objects are only slightly reflective, and highly reflective objects are only slightly emissive. Passive millimeter wave imaging creates an image from both the emitted and the reflected electromagnetic energy. Active millimeter wave imaging also relies on energy emission and reflection, but enhances the energy content in a scene by illuminating the scene with added energy. The added energy increases the contrast or distinction in energy emanated from different points within the scene, primarily by increasing the reflected energy. Because passive millimeter wave imaging relies on the inherent natural energy emanating from the objects and the background in the scene, and such inherent natural energy is generally less than the amount of energy resulting from actively illuminating the scene with added energy, it is typically more difficult to create an image passively.

In some scenes, the distinction between the brightness temperature of an object and the brightness temperature of the background is relatively small. Slight differences in the brightness temperature of the objects and the background increase the difficulty of detecting those energy differences with enough distinction to create images with good contrast and resolution relative to the background. Inadequate contrast, resulting from an inability to detect relatively small differences in radiated energy from point to point within the scene, degrades the quality of the image. The ability to form good millimeter wave images is therefore directly related to the ability to recognize relatively small differences in the amount of millimeter wave energy emanated from different points within the scene, which is particularly important in passive millimeter wave imaging because of the relatively small differences in energy emanated from objects in the scene.

Millimeter wave imaging is further complicated by the fact that millimeter wave energy constitutes only a very small band or part of the spectrum of energy emitted by a body. The temperature-related quantum effects result in an energy distribution throughout a wide spectrum of frequencies. For millimeter wave imaging, only the frequency spectrum of radiation within the millimeter wavelength (30–300 GHz) is examined. Moreover, the typical millimeter wavelength frequency band used in millimeter wave imaging is even further restricted, for example, at 94±2 GHz. The amount of energy available is generally related to the bandwidth. Consequently, the limited bandwidth also reduces the amount of energy available to be detected for use in creating millimeter wavelength images.

Further complications arise from the noise-like origin of the millimeter wavelength energy which is detected to create the images. The thermally induced quantum effects result in a significant variations in frequency distribution and intensity of the emitted energy, thereby causing the radiated energy to have random characteristics similar to noise. In the usual sense, noise is considered as a factor which contaminates or derogates an otherwise pure signal. The relatively pure nature of the underlying signal assists in distinguishing the corrupting noise and eliminating its effects, in typical signal processing. However, there is no underlying pure signal in passive millimeter wave imaging, due to the thermally induced and random quantum effects which create the emitted radiation. Consequently, it is necessary to rely on a primary noise-like signal for the information to create the image, and to attempt to eliminate or reduce the effects of other noise-like signals that have the potential to obscure the desired information from a primary signal. Thus, distinguishing the desired information carried by a noise-like signal from spurious and derogating noise-like signals of similar characteristics is a significant challenge in millimeter wave imaging.

The noise-like origin and characteristics of natural millimeter wave radiation, the limited bandwidth of energy within the millimeter wavelength spectrum from which to form the image, the relatively small differences in brightness temperature of the object in a scene compared to its background, and many other factors, have indicated a capability to enhance millimeter wave imaging by using multiple channels (radiometer channels are typically used for passive imaging and receiver channels are typically used for radar and most types of active imaging, although radiometer channels may be used in certain instances for non-radar active imaging), arranged in a focal plane array and scanning the energy emanating from the scene into the multiple channels. The channels convert the received or scanned-in radiant energy into electrical output value signals or samples. The multiple output values or samples from multiple different channels scanning each point are added together to create a pixel in the image which corresponds to that point in the scene. Each pixel has an intensity which is derived from adding the multiple samples.

One disadvantage of using multiple radiometer channels or receiver channels to obtain the multiple samples to be added together is that each channel has its own individual and particular response characteristics. In response to viewing exactly the same point having one brightness temperature, each channel creates a slightly different output value. When the slightly different samples from the multiple channels are combined to create each pixel, the intensity of the pixel does not faithfully represent the brightness temperature of the corresponding point in the scene. Adding signals which are slightly different, even when those signals originate from a single point in the scene with a uniform brightness temperature, results in slight derogation in contrast of the image. Such image derogation is not related to the energy content of the scene, but is related to the slightly different characteristics of the channels used to obtain the samples. Moreover because of the scanning effect, the anomalous effects introduced by the individual and different characteristics of each channel are distributed among various different pixels in the image, thereby decreasing the contrast and the quality of the image.

Despite careful efforts to make each radiometer and receiver channel exactly the same, each channel has its own unique gain, offset and noise temperature and response characteristics. Gain refers to the capability of the channel to amplify input signals it receives. Each channel characteristically amplifies a known constant input signal by a slightly different amount. Offset refers to a characteristic output signal level of the channel in response to a known input signal. The output signal level from each channel will be slightly different in magnitude in response to a known uniform input signal. The noise temperature characteristics of a channel relate primarily to electrical imperfections of components used in the channel, as opposed to the physical temperature of the channel itself. The noise temperature is extremely high relative to physical thermal temperature, and each channel has a significantly different noise temperature even when the physical temperature of the channels is maintained uniform.

To counteract the effects of the individual response characteristics of each channel, it is traditional to position a mechanical chopper in the optical path between the scene energy and the channels. The chopper periodically and rapidly introduces a known uniform brightness element, such as a black body, into the optical path, and each channel is quickly readjusted while the uniform brightness element is momentarily inserted in its optical path. The use of such choppers, and the necessity to quickly readjust each channel while still measuring radiation from the scene, greatly complicates the imaging process and the equipment necessary to perform the imaging.

To avoid the use of choppers, efforts have been made in the past to normalize the gain response characteristics of each channel. Normalization involves dividing the output response of each channel by the gain of the channel. In this manner, the response of each channel is gain normalized, so that when the samples from the channels are added, their contributions are of uniform relativity based on gain. While gain normalization has enhanced the quality of the image, gain normalization has not eliminated image anomalies arising because of the particular differences in offset and noise temperature characteristics of the channels. Moreover, the typical type of gain normalization employed in the prior art has been discovered not to account adequately for all variations in gain among the different channels.

SUMMARY OF THE INVENTION

The present invention involves a new and improved method of reducing or eliminating the effects of the random and inherent noise-responsive variations in output value signals from radiometer channels or receiver channels into which radiant energy from a scene is directed by a movable scanning element during millimeter wave imaging. While efforts have been made in the past to compensate for differences in gain among the channels when composing the millimeter wave image, it is believed that no efforts have been made to reduce the unpredictable and non-calculable variations in output value signals resulting from differences in response characteristics due to random noise. As a consequence of these past practices, the contrast and quality of the millimeter wave images has been diminished.

In general, the present invention involves compensating for the inherent and unpredictable variation in response to noise of the output value signals from each of a plurality of channels receiving radiant energy emanating from a scene, in the context of millimeter wave imaging. A method of the invention involves composing an image of the scene from a plurality of composition signals which are each related to corresponding output value signals from the channels, weighting at least some of the composition signals by a weighting factor, and using a weighting factor for weighting at least some of the composition signals which is different from a weighting factor used for weighting at least some of the other composition signals, before composing the image from the plurality of weighted composition signals. Preferably, the standard deviation of variation of each output value signal relative to that signal's mean output value is established, and each composition signal is weighted by multiplying the corresponding output value signal by the reciprocal of the standard deviation of that output value signal. The image is thereafter composed by adding the weighted composition signals. The image is preferably formed by a plurality of pixels, and the intensity of each of the pixels is established by adding the weighted composition signals attributable to that pixel.

Weighting the composition signals based on the standard deviation of variation of each of their corresponding output value signals has the effect of minimizing the variance of the composition signals when they are added together to form the image and the intensity of each pixel of the image. By minimizing the variance of the added-together composition signals, the anomalous effects created in the image as a result of the random and unpredictable noise response characteristics of each channel is minimized, resulting in greater contrast and quality in the image produced.

Such improvements are particularly useful in forming the intensity of each pixel of the image from multiple output value signals from multiple channels. In such circumstances, weighting the contributions from each channel in a relationship which is inversely related to the standard deviation of the channel contributing to the pixel intensity assures that those channels that are more noisy will have less contribution to the final pixel intensity than the contributions from those channels which are less noisy. Reducing the contribution of the channels which are more noisy and increasing the contribution of the channels which are less noisy has the effect of diminishing anomalous effects in the image which would otherwise occur because of the random and unpredictable effects of noise. Moreover, the present improvements can be used in conjunction with other techniques to improve image quality without reducing the benefits obtained from the present invention.

Other preferable aspects involve measuring the variation in response of the output value signals from each channel to establish the weighting factor for each channel. Since the random noise-created effects which the present improvement is intended to minimize can not be calculated, the response of the channels to radiant energy from points of uniform brightness within a scene provides the basis for determining the deviation information from which the weighting factor is obtained for each channel.

Other preferable aspects involve reducing a scene-independent baseline signal component of the output value signal from each channel. The magnitude of the baseline signal is established at each position of a movable scanning element which directs radiant energy from the scene into the channels. The magnitude of the baseline signal at each position of the movable scanning element is subtracted from the output value signal. Subtracting the value of the baseline signal results in a baseline-compensated output value signal which more clearly represents the brightness temperatures of points in the scene in a manner which has not been influenced by the scene-independent effects of the movable scanning element. The magnitude of the baseline signal is also obtained by measuring the output value signals from each channel at each position of the movable scanning element while energy from a scene of uniform brightness is directed into each channel.

A further preferable improvement in composing the image involves normalizing the weighted baseline-compensated output signals from each channel on the basis of a flat fielding response of the channels. The normalization involves compensating for the different gains of each channel and the different drifts in offsets of the output value signals from each channel. The gain characteristics of each channel are preferably measured, while the different offset characteristics of each channel are preferably calculated based on a consistency condition that an unknown mean scan temperature encountered by each channel into which radiant energy from a portion of the scene is scanned is equal to the average of the intensities of those pixels to which the baseline-compensated output signals from that channel contributes, where the average of pixel intensities is calculated based on an expression for the average pixel intensities in terms of the unknown mean scan temperatures of the channels. The basis for the normalization calculation is that each channel observes a different mean scan brightness temperature from a portion of the scene from which radiant energy is directed to the channel in comparison to the mean brightness temperature of the entire scene.

Another aspect of the present invention pertains to a millimeter wave imaging camera implementing the methodology described above. The millimeter wave imaging camera comprises a signal processor for performing the actions and calculations to weight the value of each composition signal, to subtract the baseline signal component from the output value signals to establish the baseline-compensated component signals, to weight the value of each baseline-compensated component signal, to normalize the baseline-compensated weighted composition signals, and to compose the intensity of each pixel of the image by adding the values of the normalized, baseline-compensated and weighted signals.

A more complete appreciation of the scope of the present invention and the manner in which it achieves the above-noted and other improvements can be obtained by reference to the following detailed description of presently preferred embodiments taken in connection with the accompanying drawings, which are briefly summarized below, and by reference to the appended claims.

TERMINOLOGY

Figure 1:
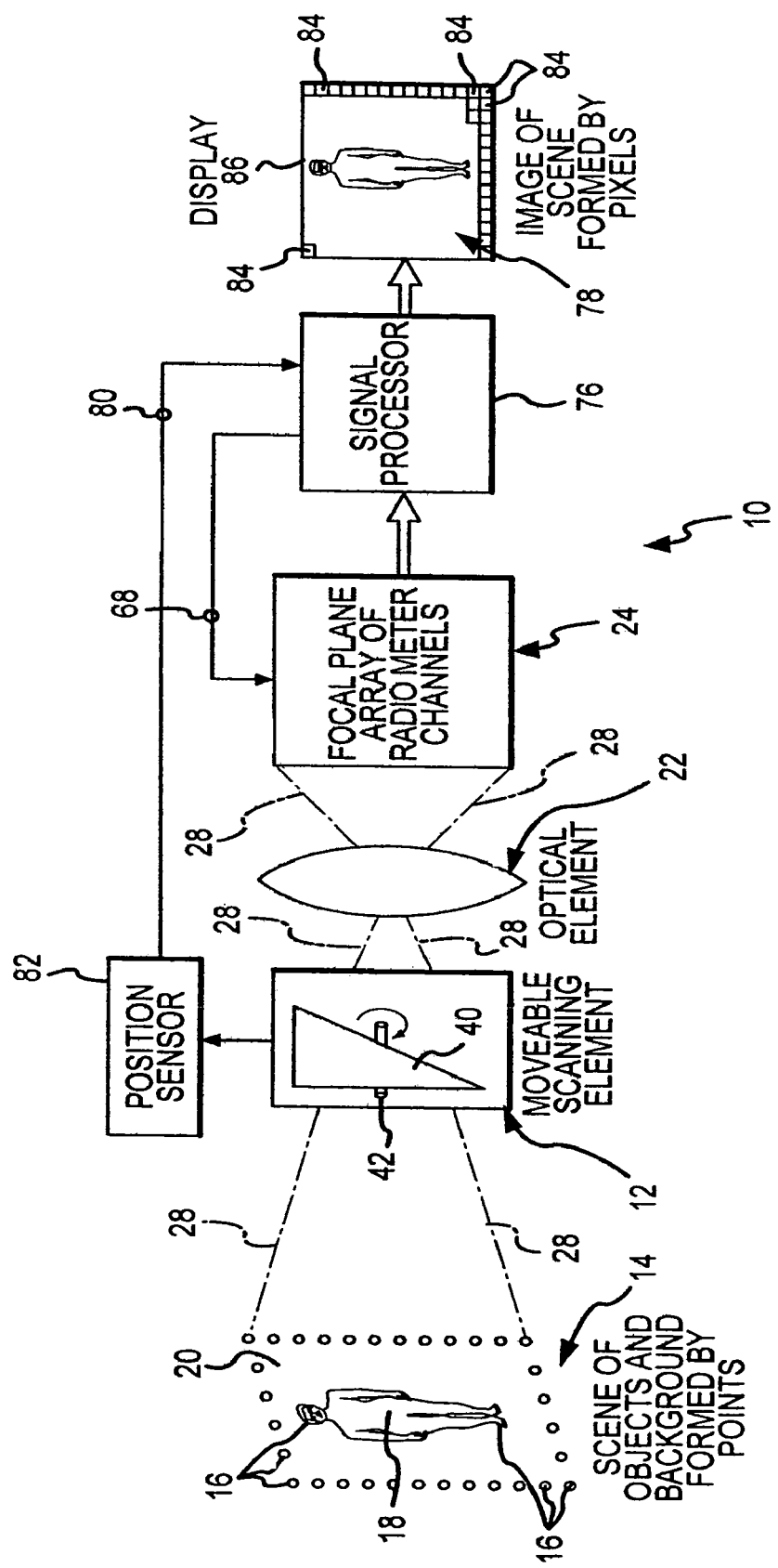
FIG. 1 is a block and schematic diagram of a millimeter wave imaging camera which incorporates and illustrates features of the present invention.

In the following Detailed Description, certain nomenclature and symbols are used to describe the present invention. Although the terms are also described in the Detailed Description, the following list presents many of those terms for reference purposes.

| Symbol | Definition |
| --- | --- |
| A | The N × N matrix used in the derivation of the solution for the $\theta_i$. |
| $A_i$ | The $i^{th}$ column vector of matrix A. |
| A' | The N × (N − 1) matrix that results from deleting the $N^{th}$ column vector of matrix A. |
| $(A')_{inv}$ | The (N − 1) × N matrix used in computing $\theta_i$. |
| b | The N × 1 column vector used in computing $\theta_i$. |
| $B_{ik}$ | The baseline signal of channel number i at observation position k. ($1 \leq i \leq N$, $1 \leq k \leq L$) |
| β | The pre-detection bandwidth of a channel. |
| C(m) | The contribution counts to each pixel m in the composed image for $1 \leq m \leq M$. |
| $g_i$ | The gain or amplification of channel number i. ($1 \leq i \leq N$) |
| i | The designation of one channel in the focal plane array. |
| I(m) | The image intensity at pixel number m of the display. ($1 \leq m \leq M$) |
| I'(m) | The image intensity at pixel number m of the display of an intermediate image formed during the composition of a final image using a drift compensated flat fielding technique described below. |
| k | The observation position of the movable scanning element, such as the wedge shaped element, where an observation of the output value signals from each channel of the focal plane array is sampled. |
| L | The number of observation positions of the movable scanning element where a channel output value signal or observation is sampled or obtained. Also, the number of subframes used to form a complete image of the scene, with each subframe containing N number of channel output value signals u at each observation position. |
| M | The selected maximum number of pixels which constitute the display. |
| m | The designation for each pixel of the display which contributes to the image composed. |
| n | The number of a scan number. |
| N | The number of channels in the focal plane array. Also, the number of simultaneous linear equations expressing relationships between the unknown mean relative scan brightness temperatures $\theta_1, \theta_2, \ldots, \theta_N$. |
| u | The uncompensated output value signal from a channel, each also referred to as an observation. |
| $s_i$ | The scene brightness temperature encountered by channel i. |
| $T_i^R$ | The noise temperature for channel i. |
| $u_i$ | The uncompensated output value signal u from a channel i. |
| $u_{ik}(n)$ | The uncompensated output value signal u from a channel i at rotational position k in scan number n. |
| v | The number of complete scans (e.g., revolutions for the rotating wedge shaped element) which creates sufficient data for forming values of the baseline signal characteristics for each channel. |
| $u_{o,i}$ | The offset value of channel i. |
| $x_{ik}$ | The channel output value signal or observation sampled or obtained from the channel i at observation position k, after baseline subtraction. ($1 \leq i \leq N$, $1 \leq k \leq L$) |
| $\hat{x}_{ik}$ | The channel output value signal or observation $x_{ik}$ from the channel i of the focal plane array at the observation position k of the movable scanning element after normalization using a flat fielding technique. ($1 \leq i \leq N$, $1 \leq k \leq L$) |
| $\bar{x}_i$ | The average $\frac{1}{L}\sum_{l=1}^{L} x_{il}$ of the output value signals or observations from channel i over one complete scan (all L observation positions) by the movable scanning element. ($1 \leq i \leq N$) |
| σ | The standard deviation of the random noise signal produced by the channel number i, ($1 \leq i \leq N$), when that channel views a scene of constant brightness temperature. |
| $\hat{\sigma}_i$ | The standard deviation of the normalized version of the random noise signal produced by the channel number i, ($1 \leq i \leq N$), when that channel views a scene of constant brightness temperature. |
| $\sigma_i^V$ | The standard deviation of the output value signal of the channel i when viewing a general scene i.e. a scene with an arbitrary brightness temperature distribution. |
| $\sigma^{Backend}$ | The backend noise standard deviation of a channel. |
| τ | The time constant associated with a post-detection bandwidth of a channel. |
| $\theta_i$ | The mean relative scan brightness temperature seen by each channel i, ($1 \leq i \leq N$) in the course of a complete scan. |
| $\delta_{ikm}$ | The binary quantity that has value 1 if the output value signal from channel i at observation position k contributes to pixel number m, and it has the value 0 otherwise. $\delta_{ikm}$ specifies the scanning pattern or scanning trajectory of each channel of the focal plane array, and are known quantities for each channel for $1 \leq i \leq N$, $1 \leq k \leq L$, and $1 \leq m \leq M$. |

DETAILED DESCRIPTION

A camera 10, shown in FIG. 1, incorporates and operates in accordance with the various aspects of the present invention. The camera 10 includes a movable scanning element 12 which receives emitted and reflected radiation energy emanated from a scene 14. The scene 14 is formed by points 16, and each of the points 16 is either part of an object 18 within the scene 14 or part of a background 20 within the scene 14. The points 16 of the scene 14 emanate radiation energy with an intensity which is related to the brightness temperature of that point. The emanated radiation energy includes energy in a millimeter wavelength frequency band which is emitted and reflected from the objects 18 and the background 20.

Figure 2:
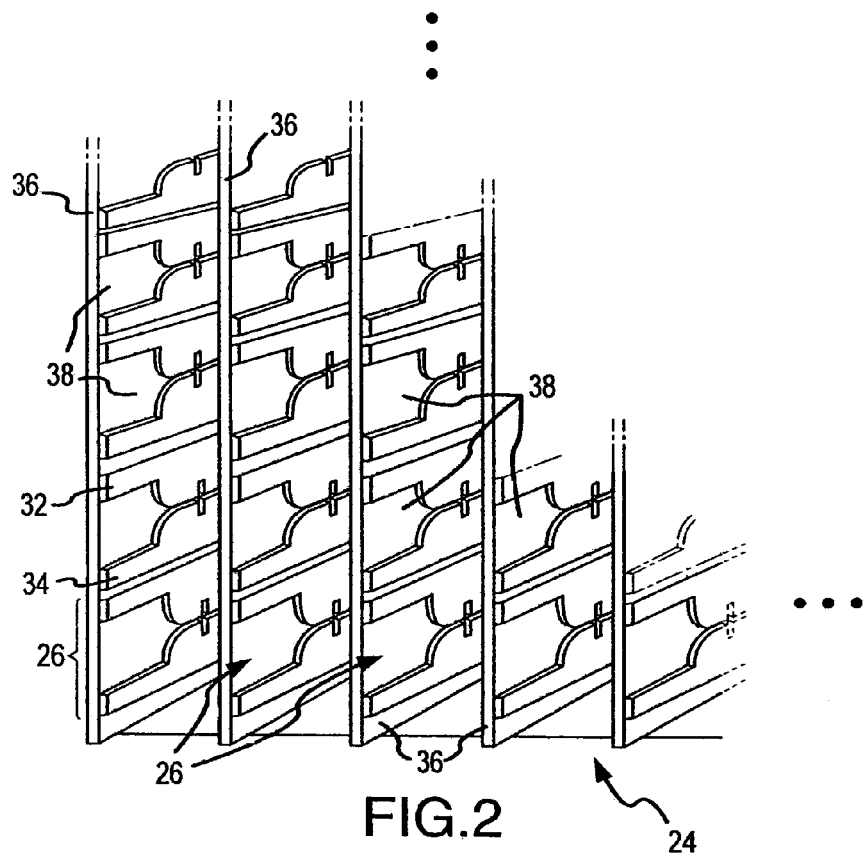
FIG. 2 is a partial perspective view of a number of individual radiometer or receiver channels of a focal plane array in the camera shown in FIG. 1.
Figure 3:
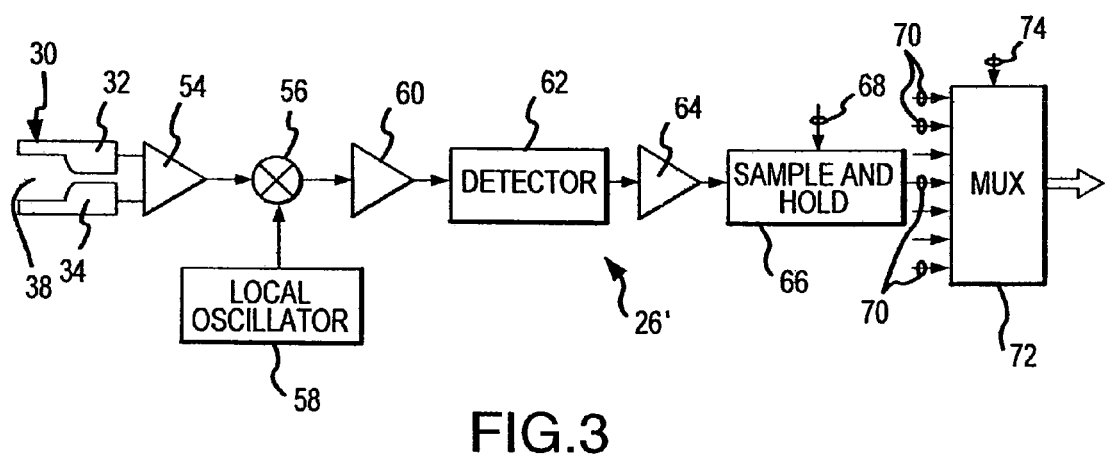
FIG. 3 is an electrical component block diagram of a single radiometer channel, of the type which might be used as one of the channels of the focal plane array shown in FIGS. 1 and 2.

The movable scanning element 12 receives emanated energy from the scene 14, and directs or steers that energy through an optical element 22 to a focal plane array 24 of channels 26. Each channel 26 will typically be a radiometer channel when the camera 10 is used in passive imaging, and each channel 26 will typically be a receiver channel when the camera 10 is used in active imaging, although it may be possible that either type of channel may be used for either type of imaging. The individual channels 26 of the focal plane array 24 are shown in FIG. 2 and an exemplary radiometer channel 26' is shown in FIG. 3. As shown in FIG. 1, an optical path 28 extends from the scene 14, through the movable scanning element 12, to the optical element 22 and to the focal plane array 24.

As shown in FIG. 2, the focal plane array 24 is formed by a multiplicity of individual channels 26, arranged in a two-dimensional array to receive radiation energy. Each channel 26 responds to energy received by an antenna 30 of each channel 26, as is also shown in FIG. 3. Each antenna 30 preferably takes the form of a conventional endfire traveling wave slot antenna. Each antenna 30 is preferably formed by two metallic elements 32 and 34 that remain on a dielectric support substrate 36 after sheet metal (not shown) which was originally attached to the substrate 36 has been photolithographically etched away to leave the remaining elements 32 and 34. In this manner, a plurality of channels 26 can be formed in parallel on a single support substrate 36, and the focal plane array 24 may be formed by stacking or positioning a number of the support substrates 36, each with a plurality of parallel channels 26, in parallel adjoining relationship with one another, as shown in FIG. 2.

The shape of the metallic elements 32 and 34 establishes a cavity 38 into which the radiation from the scene 14 (FIG. 1) is received. Each channel 26 establishes an output value signal based on the amount of radiation received by the antenna 30. The shape of the cavity 38 establishes a field of view for each channel 26. The field of view is that angular spatial volume from which radiation energy is received by the antenna 30. The inherent field of view of each antenna 30 is defined by a relatively slight angle of divergence relative an axis (not shown) between symmetrical parts of the cavity 36 and parallel to the metallic elements 32 and 34.

The inherent field of view of each channel 26 causes the vast majority of radiation energy to be received within the relatively slight angle of the field of view of each antenna 30. Because the natural field of view of each antenna 30 is limited in this manner, the natural field of view of each channel 26 is not usually sufficient to receive energy from the entire scene 14 (FIG. 1), even when multiple channels 26 are employed in the array 24 of the camera 10. Consequently, the movable scanning element 12, shown in FIG. 1, is employed in the camera for the purpose of increasing the field of view of the optical path 28 so that radiation energy from the entire scene is scanned, directed or steered into the focal plane array 24.

The movable scanning element 12 directs or scans emanated radiation energy from all points 16 of the scene 14 into the focal plane array 24, so that the emanated radiation energy from the entire scene 14 is detected and used to create an image. Of course, if the focal plane array 24 had enough channels positioned at the appropriate locations so that the inherent field of view of each antenna of each channel received energy from the entire scene 14, and there was some amount of overlap between the fields of view inherently obtained from the antennas of the channels, it would not be necessary to use the movable scanning element 12. However because of practical size and cost considerations, the movable scanning element 12 will typically be employed in the camera 10.

One type of movable scanning element 12 employs a wedge shaped refractive element 40 which is rotated about an axis 42. The wedge shaped characteristic of the element 40 increases the field of view of the optical path 28 by refracting the energy from a wider field of view. Consequently, energy from all points 16 within the scene is scanned into one or more of the channels 26 of the focal plane array 24. The increase in the field of view achieved by the scanning element 12 results because of the refraction characteristics of the wedge shaped element 40, and by rotation of the wedge shaped element 40 around the axis 42.

Figure 4:
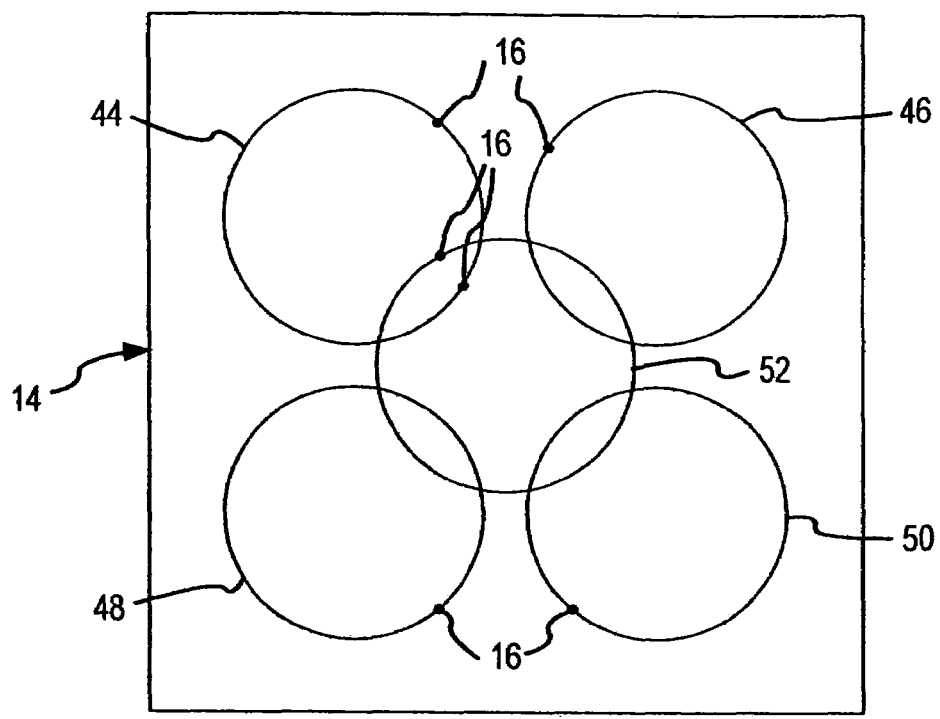
FIG. 4 illustrates five separate scanning paths of five separate channels created by a movable scanning element of the camera shown in FIG. 1.

The rotation of the wedge shaped element 40 creates a scanning path or trajectory in the form of a circle, as shown in FIG. 4. Five circles 44, 46, 48, 50 and 52 are illustrated in FIG. 4, and each circle 44, 46, 48, 50 and 52 illustrates the scanning path or trajectory of points 16 in the scene 14 from which five separate channels 26 of the focal plane array 24 (FIGS. 1 and 2) receive radiation energy emanated from the scene 14. One channel of the focal plane array receives radiation energy emanated from those points 16 of the scene 14 which are illustrated by a single circle. Some of the circles 44, 46, 48, 50 and 52 shown in FIG. 4 overlap with one another, indicating that different channels receive energy emanated from the same points within the scene 14 where the overlap occurs.

Figure 5:
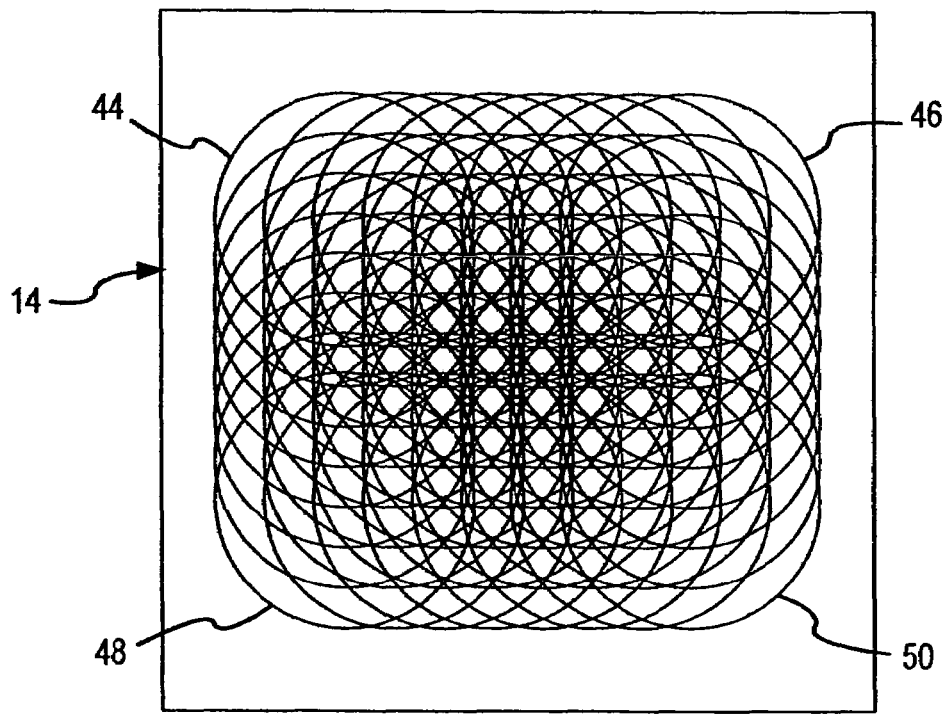
FIG. 5 is a more complete version of FIG. 4, illustrating the overlapping nature of the scanning paths of sixty-four separate channels of a focal plane array.

FIG. 5 illustrates the overlapping nature of all of the fields of view of sixty-four circles created by sixty-four channels of a practically sized focal plane array. The overlapping nature of all of the fields of view shown in FIG. 5 is the same functionally as the fewer number of fields of view shown more simplistically in FIG. 4.

As is apparent from the overlapping scan patterns shown in FIGS. 4 and 5, each channel receives radiation emanating from many points in the scene 14 but none of the channels receive radiation emanated from all of the points in the scene. The non-overlapping nature of some of the scanning patterns shown by the circles 44, 46, 48 and 50 in FIG. 4 illustrates that some channels receive radiation that other channels in the focal plane array do not receive, and the fact that none of the scanning patterns encompass the entire scene 14 illustrates that none of the channels receive radiation from all points in the scene.

The output value signals for each channel are electrical signals derived by interaction of conventional components of each channel 26. The conventional components of a radiometer channel 26' are shown in FIG. 3. The characteristics of the cavity 38 of the antenna 30 cause the radiation energy at a desired millimeter wavelength to set up a traveling wave within the cavity 38. The radiation energy at the desired millimeter wavelength has the effect of developing a relatively small electrical signal between the two elements 32 and 34, and this signal represents the strength of the radiated energy at the desired millimeter wavelength frequency. The signal from the antenna elements 32 and 34 is amplified by a low noise amplifier 54 and the amplified signal is applied to a mixer 56.

In the mixer 56, the output signal from the low noise amplifier 54 is heterodyned with a signal from a subharmonic local oscillator 58. The result of the heterodyning in the mixer 56 is an output signal from the mixer 56 which is reduced in frequency relative to the desired millimeter wavelength frequency to which the antenna 30 responds, but which retains the energy content information of the millimeter wavelength signal received by the radiometer channel 26'.

The reduced frequency signal from the mixer 56 is applied to another amplifier 60 which amplifies its magnitude before supplying the amplified signal to a detector 62. The detector 62 recognizes the value of the energy content of the signal supplied to it and supplies an output signal related to the energy content to another amplifier 64. The amplifier 64 further amplifies the level of the signal from the detector 62 and supplies the amplified signal to a sample and hold circuit 66. The signal supplied to the sample and hold circuit 66 therefore represents the amount of energy at the desired millimeter wavelength frequency which the radiometer channel 26' detects.

The sample and hold circuit 66 responds to a control signal 68 to establish the time at which the energy content-related signal from the amplifier 64 is to be sampled and held. In response to the control signal 68, the sample and hold circuit determines the value of the energy content-related signal supplied to it from the amplifier 64, and holds that sample value until the next subsequent control signal 68 causes it to sample another instantaneous value of the signal supplied by the amplifier 64 at that later time.

The sample signal which is held and supplied by the sample and hold circuit 66 is an output value signal 70. The output value signal 70 represents the quantity of millimeter wave radiation within a relatively narrow frequency band surrounding a frequency equal to two times the local oscillator frequency, as detected by the radiometer channel 26' at approximately the time of the control signal 68.

The output value signal 70 from the sample and hold circuit 66 is applied to a multiplexer 72. The multiplexer 72 may be common to a multiplicity of radiometer channels 26', such as all of the radiometer channels 26' attached to a single dielectric substrate 36 (FIG. 2). Alternatively, the multiplexer 72 may be common to all of the channels of the entire focal plane array 24 (FIGS. 1 and 2). The multiplexer 72 selects the desired output value signal 70 from each of the radiometer channels 26' in response to a select signal 74, and the selected radiometer output value signal 70 is thereafter supplied from the multiplexer 72 to a signal processor 76 of the camera 10 (FIG. 1). The signal processor 76 uses the output value signals 70 from the radiometer channels 26 to formulate or compose an image 78 (FIG. 1) which corresponds to the scene 14. The signal processor 76 preferably includes a conventional digital computer which has been programmed to perform the actions and to execute the computations described herein.

Although not specifically shown, a receiver channel is generally similar to the radiometer channel 26' shown in FIG. 3, except that in place of the detector 62 a conventional magnitude and phase detector component is employed. The conventional magnitude and phase detector component recognizes phase information between the illuminating signal and the received signal, as well as the magnitude of the energy content at the particular phase relationship. The magnitude and phase information is sampled and held by the circuit 66 in response to the control signal 68, and the multiplexer 72 delivers the signals containing the magnitude and phase information to the signal processor 76 (FIG. 1). The additional phase relationship information allows the signal processor 76 (FIG. 1) to derive additional knowledge describing the scene, such the range and the velocity of points within the scene.

It is also typical in a receiver channel (not shown) that the component designated as the local oscillator 58 in FIG. 3 also performs the role of generating the energy use to illuminate the scene, as well as a heterodyning function. In such circumstances a conventional beam splitting device is used to direct part of the illuminating energy out of the antenna 30 and to allow energy received from the scene to be transferred through the other components of the receiver channel to function in the manner described. Under such circumstances, a signal describing the illuminating signal is supplied to the magnitude and phase detection component which replaces the detector 62, so that the phase information can be derived as well as the magnitude information.

As shown in FIG. 1, the signal processor 76 receives position signals 80 from a position sensor 82 which is associated with the movable scanning element 12. The position sensor 82 derives signals corresponding to each of the scanning or rotational positions of the wedge shaped element 40. One technique for deriving the position signals is to attach a bar code to the exterior of the rotating wedge shaped element 40, and to read the bar code directly to obtain rotational position information at each rotational interval of the wedge shaped element 40. The information from the position signals 80 correlates to points 16 in each scanning trajectory of the scene 14, represented by the circles 44–52 (FIG. 4), for each channel 26 of the focal plane array 24.

The position signals 80 are also used by the signal processor 76 to coordinate the delivery of the control signals 68 to the sample and hold circuit 66 (FIG. 3). In response to the control signals 68, the output value signals 70 from each channel 26 are derived at points 16 in the scene 14 which correlate to the position signals 80. Consequently, each output value signal 70 from each channel 26 is established and correlated to a point 16 in the scene 14 by the position signals 80 and by the delivery of the control signals 68 and the select signals 74 (FIG. 3) in relation to the position signals 80.

The signal processor 76 associates the output value signals 70 from points 16 in the scene 14 with individual pixels 84 of a display 86 in accordance with the position signals 80. An image 78 is formed on the display 86, and the image 78 is formed by individually controlling the intensity of each of the pixels 84. The image 78 formed on the display 86 includes a representation of the scene 14, as well as the object 18 in the scene and the background 20 of the scene.

To form the image 78, the signal processor 76 correlates each output value signal 70 from each channel 26 at each position of its scanning path, as determined by the position signals 80, with an individual pixel 84 of the display 86. The signal processor 76 calculates the intensity of each pixel 84 from a sum of the output value signals 70 associated and correlated with each individual pixel 84, after the output value signals 70 have been processed in accordance with the various improvements described below. The final intensity of the each pixel 84 is dependent on the contribution from each of the output value signals 70 from each channel which scans the point 16 in the scene 14 that corresponds to the pixel 84 in the image 78.

The correlation of the contributions from the output value signals 70 to each pixel 84 in the image 78 is facilitated by generating a table that correlates each specific position signal 80 with each channel 26 that contributes an output value signal to each pixel 84. Such correlation is illustrated by a pixel position table shown below. The pixel position table illustrates the form of entries for a focal plane array 24 with N channels and a wedge shaped element 40 with L discrete position marks on its periphery, each of which generates a separate position signal 80. Each entry in the pixel position table relates to a pixel number lying between 1 and M, where M is the number of pixels in the full image 78. Computing this table before performing imaging computations, and storing the table in memory for later access when performing the imaging computations, is of benefit when composing the full image 78 from the channel output value signals 70 recorded at each position represented by a position signal 80.

|  | Channel 1 | Channel 2 | . . . | Channel N |
| --- | --- | --- | --- | --- |
| Position 1 | Pixel Number | Pixel Number | . . . | Pixel Number |
| Position 2 | Pixel Number | Pixel Number | . . . | Pixel Number |
| . | . | . |  | . |
| . | . | . |  | . |
| . | . | . |  | . |
| Position L | Pixel Number | Pixel Number | . . . | Pixel Number |

Although the movable scanning element 12 has been described in conjunction with a rotating wedge shaped element 40, other types of movable scanning elements may be used. For example, another type of movable scanning element is a rotating mirror located in the optical path which is retained at a non-orthogonal angle to its rotational axis. The non-orthogonal orientation causes reflections of the radiated energy along a path that is not parallel to the rotational axis, in a manner which is functionally the same as creating the scanning path or trajectory achieved by the rotating wedge shaped element 40.

The scanning trajectory or path created by the rotating wedge shaped element 40 is illustrated as circular in FIGS. 4 and 5, but the scanning path need not be circular. A variety of different scanning paths may be employed depending upon the geometry and orientation of the focal plane array and the scene which is to be scanned. For example, linear scans may be used in certain circumstances. A linear scanning path can be achieved by using two counter-rotating wedge shaped elements 40 in the optical path. Any scanning path which involves scanning the scene 14 with non-zero overlaps between the scanning paths of the individual channels 26 may be used.

In general, a single complete scan of the radiation energy emanating from the scene 14 may be used to create a single image 78 on the display 86. By updating the image 78 with periodically-executed scans of the scene 14, the images 78 may be presented on the display 86 in a relatively time-current and time-updated manner.

One aspect of the present improvements has resulted from the discovery that, when the wedge shaped element 40 is rotating and scanning a scene of a uniform brightness temperature, i.e. a flat field, the output value signal 70 for each channel 26 of the focal plane array 24 is dependent on the position of the wedge shaped element 40. This discovery has led to the realization that output value signals of the channels become partially independent of the brightness temperature of the points 16 in the scene 14. The scene-independent portions of the channel output value signals which occur as the wedge shaped element 40 accomplishes a full scan of uniform field scene 14 are described herein as a baseline signal or curve for that channel. The strength of the baseline signal is dependent upon the position of the wedge shaped element 40. More importantly however, the value of the baseline signal may overwhelm the change in channel output value signals that occurs in response to brightness temperature contrasts in a typical scene 14. Consequently, the effect of the baseline signal may eliminate or reduce contrasts in brightness temperature when scanning the scene.

While the exact cause of the baseline signal may not be fully understood, it is believed that the baseline signal is the result of a standing wave which occurs between the antenna 30 (FIGS. 2 and 3) of each channel 26 and the refractive surfaces of the rotating wedge shaped element 40. Because of the angled surface of the wedge shaped element 40, the distance between the antenna 30 and the refractive surfaces of the wedge shaped element 40 varies in direct relationship to the rotational position of the wedge shaped element. This change in distance or geometry has the effect of changing the phase or reflection characteristics which a standing wave would undergo between the wedge shaped element 40 and the antenna 30, at different positions of the wedge shaped element 40. This being the case, other types of movable scanning elements 12, such as a mirror with a non-orthogonally oriented rotational axis, is also likely to create standing waves and scene-independent variations in the output value signals from the channels.

The changing characteristics of the standing wave at different positions of the wedge shaped element 40 causes the magnitude of the output value signal 70 from each channel to be altered in a manner related to the changing values or strengths of the standing wave. The output value signals 70 from each channel are thereby varied by an influence which is entirely independent of the radiation emanating from the scene. The change in value of the output signal resulting from this effect is undesired because it is interpreted as a change in emanated radiation from the scene, and therefore adversely influences the composition or formation of the image 78 on the display 86.

It has been discovered that the shape or curve of the baseline signals is substantially stable from one complete rotation of the wedge shaped element to the next, and the characteristics of the baseline signal curve are repeatable during each revolution of the wedge shaped element over relatively long periods of time. The dependence of the magnitude of the baseline signal of each channel on the rotational position of the wedge shaped element 40, and the substantial consistency of this baseline signal over relatively long periods of time, permits the baseline signal to be identified and valued, and then subtracted from the output value signals from the channels derived at corresponding rotational positions of the wedge shaped element. Subtracting the value of the baseline signal from the output value signals of the channels at each position of the wedge shaped element has the effect of eliminating the scene-independent influences on the channel output value signals, permitting values to be obtained which truly relate to the brightness temperatures of the points 16 of the scene 14.

Formulating the value of the baseline signal involves recording the output value signals from each channel over a selected number ν of consecutive revolutions of the wedge shaped element while scanning a scene having a flat field of uniform brightness points. Averaging the output value signals at each position over the selected number of consecutive revolutions yields a curve of baseline signals with any noise related variation suppressed for each channel.

The computation of the baseline signals for each channel is as follows. The output value signal u (70) from each channel i at rotational position k of the wedge shaped element in scan number n is denoted by $u_{ik}(n)$. The dependence on scan number n is equivalent to a dependence on time. The estimated baseline values $B_{ik}$ for each channel at the positions are set forth by Equation (1):

$$B_{ik} = \frac{1}{v}\sum_{n=1}^{v} x_{ik}(n),\ 1 \le i \le N,\ 1 \le k \le L \qquad (1)$$

In Equation (1), N is the number of channels, and L is the number of rotational positions of the wedge shaped element 40. It has been found that the use of ν=100 revolutions creates sufficient data for forming values of the baseline signal characteristics for each channel.

Once the baseline curve for each channel has been developed, the correction of the output value signals 70 for each channel is performed by subtracting the baseline values from the observed output value signals. Subtraction yields the signal $x_{ik}$ that is substantially free from the scene-independent and undesired effects of rotational position of the wedge shaped element, as shown by Equation (2):

$$x_{ik}(n) = u_{ik}(n) - B_{ik},\ 1 \le i \le N,\ 1 \le k \le L. \qquad (2)$$

In Equation (2), the value of the baseline curve for each channel i at the position k is represented by the value $B_{ik}$.

By identifying and measuring the value of the baseline curve for each channel at each position of the wedge shaped scanning element 40, and thereafter subtracting the value of the baseline curve from the output value signals from each channel at each position, the signals used by the signal processor 76 in creating the image 78 represent the differences and contrasts in the brightness temperature of the points 16 within the scene 14. Consequently, the image 78 is more accurate since it is no longer adversely influenced by the scene-independent influences.

The baseline-subtracted channel samples or observations $x_{ik}$ are used to create a set of new values $\hat{x}_{ik}$ that are used in performing other improvements described below. Those improvements result in the channel output value signals being normalized more effectively. The improved normalization enhances the quality of the image 78 by avoiding reductions in contrast between the pixels 84 arising from effects other than actual differences in brightness temperature between corresponding points 16 of the scene 14.

A previously known millimeter wave image composition technique has recognized the fact that each channel has different response characteristics. The previously known technique has attempted to scale or normalize the output value signals from the channels in relation to the differences in gain or amplification of each of the channels. While this previously known normalization technique has been partially effective, it has not been completely accurate because it has failed to take into account certain factors which are important for good contrast in millimeter wave imaging. For example, the previously known technique has assumed that each channel encounters the same mean scene brightness temperature. In reality, each channel scans only a portion of the scene, as shown by FIG. 4, and therefore each channel does not encounter the same mean scene brightness temperature because each channel does not scan the entire scene 14. Using the same mean scene brightness temperature as a basis for normalizing the response characteristics of all of the channels cannot achieve complete and accurate normalization because the normalizing factor does not apply equally to the response characteristics of each channel. The implication of this simplifying assumption in previously known normalizing techniques is that there has been non-optimal accounting for the drift in offset values of each channel over time. The offset value refers to a characteristic output value signal level of each channel in response to a known input signal. The output value signal level from each channel will be slightly different in magnitude in response to a known uniform input signal applied to all of the channels. Lastly, despite recognizing that individual channel gain may be a basis for normalization, the previously known normalizing technique failed to fully compensate for all the factors which may influence inter-channel differences in gain as is described below.

The previously known normalizing technique relates the voltage $u_i$ of the output values signal 70 from the channel i (26) to the gain of the channel $g_i$, the scene brightness temperature $s_i$, the channel receiver noise temperature $T_i^R$, and the offset voltage $u_{o,i}$ as follows in Equation (3):

$$u_i = g_i(s_i + T_i^R) + u_{o,i} \quad (3)$$

Equation (3) is true only as long as a random noise portion of the output value signal from the channel is neglected. The more precise equation for $u_i$ must include a noise voltage term $y_i$, in the right hand side of Equation (3), where $y_i$ is a random variable with mean zero and standard deviation denoted by $\sigma_i$. Neglecting the noise term $y_i$, is acceptable for known prior art conclusions about counteracting the effect of the drift in channel gain, and about removing the dependence on channel offset. However, a problem occurs when the above incomplete Equation (3) is implicitly used to develop an expression for the variance $(\sigma_i^V)^2$ of the output value signals of the channels i when viewing a scene containing a brightness temperature distribution with variance $(\sigma^S)^2$. The problem is represented by the following erroneous Equation (4):

$$(\sigma_i^V)^2 = g_i^2(\sigma^S)^2 \quad (4)$$

Equation (4) implies that the standard deviation of the channel output when viewing a scene with non-zero contrast is linearly proportional to the gain of the channel, and this leads to using $\sigma_i^V$ to normalize the inter-channel difference in gains.

However, were the noise term $y_i$ taken into account, the correct expression for the channel output variance would be shown by the following Equation (5):

$$(\sigma_i^V)^2 = g_i^2(\sigma^S)^2 + (\sigma_i)^2 \quad (5)$$

Since each channel has a thermal noise characteristic and some uncorrelated "backend" noise of standard deviation $\sigma^{Backend}$, an expression for the noise variance $\sigma_i$ in terms of the gain of the channel $g_i$, the channel receiver noise temperature $T_i^R$, the pre-detection bandwidth $\beta$ and the time constant associated with the post-detection bandwidth $\tau$, and $\sigma^{Backend}$ can be written as follows in Equation (6):

$$(\sigma_i)^2 = \left(\frac{g_i T_i^R}{\sqrt{\beta\tau}}\right)^2 + (\sigma^{Backend})^2 \quad (6)$$

Backend noise results from the slight differences that arise from quantizing analogue values into digital values, and environmental noise from other adjacent electrical components.

Equation (6) permits the standard deviation of the output value signals of the channels to be written as shown in Equation (7):

$$\sigma_i^V = \sqrt{g_i^2\left[(\sigma^S)^2 + \frac{(T_i^R)^2}{\beta\tau}\right] + (\sigma^{Backend})^2} \quad (7)$$

Equation (7) reveals the impact of neglecting to consider the noise standard deviation in using $\sigma_i^V$ to scale the channel outputs. Consider a channel with such low gain $g_i$ that its $\sigma_i^V$ value is more or less equal to the backend noise standard deviation $\sigma^{Backend}$. After multiplication by the reciprocal of $\sigma_i^V$ (i.e. the scaling operation proposed in the known prior art), the output value signals of that channel would dominate over other channels with appreciable gain (and, therefore, higher channel standard deviation). Thus, the summation of values from different channels during image composition can potentially create anomalous effects in the image corresponding to undesirable domination of the pixels along the scanning path trajectory of extremely low gain channels.

Even if the $\sigma^{Backend}$ related issue were not present, the channel receiver noise temperature $T_i^R$ that appears in the thermal noise of the channel varies from channel to channel, and is independent of channel gain $g_i$. This implies that only under the additional special condition of the same value of $T_i^R$ for all channels would the prior art normalizing technique work as intended. In reality the channel noise temperatures vary significantly from one channel to the other, despite efforts to thermally stabilize each of the channels.

To avoid these deficiencies in prior art normalizing techniques, $\sigma_i^V$ is not used to compensate the inter-channel differences in gain. Instead, the present invention relies on the results of hot and cold load calibration experiments to determine channels gains. Experience has shown the gain to be stable enough for long periods of time to scale the gain of the channel outputs.

The improvements in normalization also forego the assumption that every channel in the focal plane array encounters the same mean scene brightness temperature during a complete scan of the scene 14. While this improves the degree of normalization and the degree of contrast and quality of the image produced, it becomes necessary to develop an entire set of mean scan brightness temperatures, one mean scan brightness temperature for each channel 26. The technique employed involves estimating the mean scan brightness temperature for each channel. To do so it is necessary to provide a mathematical specification of the image formation process.

The mathematical expressions for the image intensity value I(m) of a given pixel m are statements of the result of combining or adding signals related to and derived from the channel output value signals 70 (FIG. 3) made during one complete scan. The mathematical expressions are in terms of normalized observations, obtained from the channel output value signals 70 obtained by applying a normalizing or flat fielding technique, either the prior art technique described previously, or the improved technique constituting part of the present application described below.

If every channel 26 in the focal plane array 24 had the same noise response characteristics, which is not the case, the normalized output value signals 70 could be obtained from the different channels without first weighting or adjusting them in any manner. Such a circumstance would result in the following Equation (8) for the image intensity I(m) at pixel m:

$$I(m) = \frac{\sum_{j=1}^{N} \sum_{l=1}^{L} \delta_{jlm} \hat{x}_{jl}}{\sum_{j=1}^{N} \sum_{l=1}^{L} \delta_{jlm}} (1 \le m \le M). \qquad (8)$$

However, the different channels have different noise temperatures and different offsets, and therefore, different noise standard deviations, even after normalizing by the gain of the channel. Greater weight should be given to the channels that are less noisy in composing the image 78. The best weight to apply to the contribution from channel j is inversely proportional to the noise standard deviation, $\hat{\sigma}_j$, of the normalized samples or observations. This follows from the well known principle that when forming the weighted sum of two or more random variables which have the same means but different variances, the variance of the sum is minimized when the weighting is inversely proportional to the standard deviation of the individual variables. The application of this principle yields the following Equation (9) for the final image intensity of each pixel:

$$I(m) = \frac{\sum_{j=1}^{N} \sum_{l=1}^{L} \delta_{jlm} \frac{\hat{x}_{jl}}{\hat{\sigma}_j}}{\sum_{j=1}^{N} \sum_{l=1}^{L} \frac{\delta_{jlm}}{\hat{\sigma}_j}}, 1 \le m \le M. \qquad (9)$$

The image intensity I(m) is the estimate of the relative brightness temperature of the point 16 in the scene 14 represented by the pixel m. With the notation and image intensity Equation (9), the improved flat fielding or normalizing can be described.

The improved flat fielding technique involves calculating the mean scan temperatures for each channel, $\theta_1, \theta_2, \ldots, \theta_N$ by setting up a system of N simultaneous linear equations expressing relationships between the N unknowns $\theta_1, \theta_2, \ldots, \theta_N$. The solution to these simultaneous linear equations yields the values of $\theta_1, \theta_2, \ldots, \theta_N$ that permit computation of the improved flat fielded image intensities.

The normalized samples or observations $\hat{x}_{ik}$ from each channel i (26) are expressed in terms of the output value signals (70) $x_{ik}$ and the unknown $\theta_i$ in the following Equation (10):

$$\hat{x}_{ik} = \frac{x_{ik} - \overline{x}_i}{g_i} + \theta_i, 1 \le i \le N, 1 \le k \le L. \qquad (10)$$

For the normalization represented in Equation (10), the associated noise standard deviation $\hat{\sigma}_i$, is related to the raw standard deviation $\sigma_i$ in the following Equation (11):

$$\hat{\sigma}_i = \frac{\sigma_i}{g_i} 1 \le i \le N. \qquad (11)$$

Substituting in the preceding two Equations (10) and (11), in the expression for the image intensity given in Equation (9), results in the following Equation (12):

$$I(m) = \frac{\sum_{j=1}^{N} \sum_{l=1}^{L} \delta_{jlm} \left( \frac{x_{jl} - \overline{x}_j}{g_j} + \theta_j \right) \frac{g_j}{\sigma_j}}{\sum_{j=1}^{N} \sum_{l=1}^{L} \delta_{jlm} \frac{g_j}{\sigma_j}}, 1 \le m \le M. \qquad (12)$$

$\theta_1, \theta_2, \ldots, \theta_N$ in Equation (12) are, as yet, unknown. The correct image intensities I(m) are also unknown. However, Equation (12) makes explicit the dependence of the image intensities on the unknown $\theta_1, \theta_2, \ldots, \theta_N$ and leads to the central concept of the improved flat fielding technique: For each channel, impose the consistency condition that the unknown mean scan temperature encountered by each channel be equal to the average of the intensities of those image pixels which that channel contributes to, relying, for the calculation of the image intensities average, on the expression for the intensities in terms of the unknown mean scan temperatures.

These consistency requirements provide a way of deriving as many simultaneous linear equations as the number of unknowns. Consider the circular path or trajectory of the energy scanned into any channel as it traverses the scene 14 during a scan. An expression for the mean of the brightness temperatures along this path is expressed in terms of the I(m) values along the path. For channel i, this expression is set forth in Equation (13) as follows:

Mean brightness of path from image = (13)

$$\frac{\sum_{k=1}^{L} \sum_{m=1}^{M} \delta_{ikm} I(m)}{\sum_{k=1}^{L} \sum_{m=1}^{M} \delta_{ikm}} = \frac{1}{L} \sum_{k=1}^{L} \sum_{m=1}^{M} \delta_{ikm} I(m)$$

Equation (13) makes use of the fact that the denominator in the middle expression sums to L. The requirement is next imposed that this mean scan brightness temperature, which is a function of all the channel mean brightness temperatures, be equal to $\theta_i$, the mean scan brightness temperature encountered by the particular channel whose trajectory was traversed in computing the above path mean. This strategy yields one equation per channel for each of the N channels in the focal plane array, as shown in Equation (14):

$$\frac{1}{L}\sum_{k=1}^{L}\sum_{m=1}^{M} \delta_{ikm} I(m) = \theta_i, \quad 1 \le i \le N. \quad (14)$$

Substituting in Equation (14), the expression for I(m) given in Equation (12) obtains the following linear system of equations (Equations (15)) defining the unknown per channel mean relative brightness temperatures:

$$\frac{1}{L}\sum_{k=1}^{L}\sum_{m=1}^{M} \delta_{ikm} \frac{\sum_{j=1}^{N}\sum_{l=1}^{L} \delta_{jlm} \frac{g_j}{\sigma_j} \theta_j}{\sum_{j=1}^{N}\sum_{l=1}^{L} \delta_{jlm} \frac{g_j}{\sigma_j}} - L\theta_i = \quad (15)$$

$$-\sum_{k=1}^{L}\sum_{m=1}^{M} \delta_{ikm} \frac{\sum_{j=1}^{N}\sum_{l=1}^{L} \delta_{jlm} \left(\frac{x_{jl}-\bar{x}_j}{\delta_j}\right)}{\sum_{j=1}^{N}\sum_{l=1}^{L} \delta_{jlm} \left(\frac{g_j}{\sigma_j}\right)},$$

$$1 \le i \le N.$$

It is useful to write Equation (15) using matrix notation as follows in Equation (16):

$$A \begin{bmatrix} \theta_1 \\ \vdots \\ \theta_N \end{bmatrix} = b. \quad (16)$$

In Equation (16), A on the left hand side, is an N×N matrix of coefficients, and b on the right hand side is an N×1 column vector. Each of the rows of A sum to zero, making A a singular matrix. This is consistent with the fact that the mean scan brightness temperatures are relative, permitting them to be estimated only up to an arbitrary additive term. So, with no loss of generality, one of the $\theta_1, \theta_2, \ldots, \theta_N$ can be set to an arbitrary value. It is convenient to set $\theta_N$ to zero. This permits rewriting the left hand side of Equation (16) as follows:

$$A \begin{bmatrix} \theta_1 \\ \vdots \\ \theta_{N-1} \\ 0 \end{bmatrix} = \underbrace{[A_1 \cdots A_{N-1} \; A_N]}_{\text{Matrix A expressed in terms of its Columns } A_1 \text{ through } A_N} \begin{bmatrix} \theta_1 \\ \vdots \\ \theta_{N-1} \\ 0 \end{bmatrix} \quad (17)$$

$$= \underbrace{[A_1 \cdots A_{N-1}]}_{\text{Matrix of Size } N \times (N-1)} \begin{bmatrix} \theta_1 \\ \vdots \\ \theta_{N-1} \end{bmatrix}$$

$$= A' \begin{bmatrix} \theta_1 \\ \vdots \\ \theta_{N-1} \end{bmatrix}$$

In Equation (17) A' has been introduced to denote the N×(N−1) matrix that results from deleting the N-th column vector of matrix A. Thus, the system of equations to be solved is the following Equation (18):

$$A' \begin{bmatrix} \theta_1 \\ \vdots \\ \theta_{N-1} \\ 0 \end{bmatrix} = b. \quad (18)$$

The positing of the consistency conditions among the various per channel mean scan brightness temperatures and the subsequent derivation of the linear system given in Equation (18) is implemented to achieve improved normalization or flat fielding. The actual solution of the equations is carried out using a conventional computational method of solving linear systems. Nevertheless, there are a few important details that must be considered when computing the solution.

A comparison of the left hand sides Equations (15) and (18) reveals that the elements of the matrix of coefficients A' are independent of the channel output value signals (70). This enhances the speed at which the computations are executed. If this was not the case, it would be necessary to undertake the high computational burden of computing the pseudo-inverse of an N×(N−1) matrix each time the flat fielding normalizing factors were computed. Fortunately, this burden is reduced by performing an inversion of matrix A' prior to performing the computations to obtain the flat fielding normalizing factors, storing in memory the resulting pseudo-inverse $(A')_{inv}$, and using the stored $(A')_{inv}$, during the actual flat fielding operation. The singular value decomposition of A' is used to calculate its pseudo-inverse, $(A')_{inv}$.

A comparison of the right hand sides of Equations (15) and (18) shows that the elements of the column vector b depend on the channel output value signals, and are sums of the intensities of an intermediate image I'(m) that can be defined by the following Equation (19):

$$I'(m) = \frac{\sum_{j=1}^{N}\sum_{l=1}^{L} \delta_{jlm} \left(\frac{x_{jl}-\bar{x}_j}{\sigma_j}\right)}{\sum_{j=1}^{N}\sum_{l=1}^{L} \delta_{jlm} \frac{g_j}{\sigma_j}}, \quad 1 \le m \le M. \quad (19)$$

It is convenient to compute and temporarily store I'(m) before proceeding to the estimation of $\theta_1, \theta_2, \ldots, \theta_N$.

The right hand side column vector b of Equation (18) is calculated anew at each scan to obtain the estimates of the channel mean scan temperatures. The $\theta_1, \theta_2, \ldots, \theta_{N-1}$ are obtained by post-multiplying the stored pseudo-inverse of matrix A', i.e. $(A')_{inv}$, by the most recently formed b as shown in the following Equation (20):

$$\begin{bmatrix} \theta_1 \\ \vdots \\ \theta_{N-1} \end{bmatrix} = \underbrace{(A')_{inv}}_{\text{Precomputed pseudo-inverse}} \cdot b, \quad (20)$$

And, of course, $\theta_N = 0$.

The estimated $\theta_1, \theta_2, \ldots, \theta_N$ are then used to update the intermediate image I'(m) to obtain the final flat fielded image I(m), $1 \le m \le M$, that is described by Equation (12).

It has been discovered that even when using the normalized channel output value signals, anomalous effects appear in the image 78. The anomalous effects result from differences in channel noise characteristics, which can not be predicted or calculated. Nevertheless, the present improvements further enhance the quality of the image 78. These improvements are better understood by reference to an image composition technique employing only direct summation of the normalized channel output value signals, as described below in Algorithm 1.

The image 78 is derived from the output value signals 70 of the individual channels 26 at the end of each scan of the scene. In the simple but unrealistic situation where all the channels of the focal plane array had the same gain, offset, and noise temperature, the image composition would be accomplished by summing the output values signals 70 as contributions to each image pixel, and normalizing each sum by the number of contributions received. Assuming the channels are sampled at each discrete position of the wedge shaped element 40, the inputs into this computation are the L number of subframes, with each subframe containing N number of channel output value signals 70 (each an observation), and the measured position of the wedge shaped element 40 represented by the position signals 80. The channel observations or samples are denoted by with the first subscript, i, specifying the channel number and the second subscript, k, the position of the wedge shaped element. ($1 \leq i \leq N$, $1 \leq k \leq L$). A precomputed table of pixel positions is exemplified by the table set forth above.

In a radiometer based millimeter wave imaging camera, the following Algorithm 1 is applied to compose the complete image 78, whose intensity at each pixel m is denoted by I(m):

---

Algorithm 1: Basic Unweighted Image Composition

1. Compute the pixel position table.
2. Initialize the image display I(m) to zero for $1 \leq m \leq M$.
3. Initialize an array of contribution counts C(m) to zero for $1 \leq m \leq M$.
4. For each position k between 1 through L of the wedge shaped element, and for the contribution from each channel number i between 1 through N,
    Look up the pixel number m corresponding to position k and channel i from the precomputed pixel position table.
    $I(m) = I(m) + x_{ik}$.
    $C(m) = C(m) + 1$.
5. For each m between 1 and M, $$I(m) = \frac{I(m)}{C(m)}$$

---

If each channel of the focal plane array had the same noise characteristics and their different gains and offsets had been normalized, Algorithm 1 could be used to compose the image 78, using the modified channel observations $\hat{x}_{ik}$ obtained from the original channel observations $x_{ik}$ by using flat fielding. However, each channel does not have the same noise characteristics. Therefore, even after the output value signals of each channel have been normalized to account for gain and offset differences, preferably using the improved flat fielding technique described above, the channels are likely to still differ in their noise characteristics. This is confirmed by noise measurement experiments and direct measurements of the standard deviations of noise from each of the channels.

The improved aspect of the present invention is to give greater weight to those output value signals 70 from channels 26 of the focal plane array 24 which are less noisy compared to the output value signals 70 from channels 26 which are more noisy, as discussed above in conjunction with Equation (9). The best weight to apply to the contribution from channel i is inversely proportional to the noise standard deviation, $\hat{\sigma}_i$, of the normalized channel observations. This follows from the well known principle that when forming the weighted sum of two or more random variables which have the same means but different standard deviations, the standard deviation of the sum is minimized when the weighting is inversely proportional to the standard deviation of the individual variables.

Employing this weighting concept in composing the millimeter wave image 78 involves calculating a weighted summation of the normalized channel observations. The weight to be given to the normalized channel observations is the reciprocal of the normalized noise standard deviation $$\frac{1}{\hat{\sigma}_i},$$

for $1 \leq i \leq N$. So, the improvement in the image composition algorithm requires an additional set of inputs (the weights) to be applied to the normalized observations $\hat{x}_{ik}$, as set forth in the following Algorithm 2:

---

Algorithm 2: Channel Weighting Based Image Composition

1. Compute the pixel position table. Measure the channel noise standard deviations.
2. Initialize the image array I(m) to zero for $1 \leq m \leq M$.
3. Initialize an array of contribution counts C(m) to zero for $1 \leq m \leq M$.
4. For each wedge position k between 1 through L, and for each channel number i between 1 through N,
    Look up the pixel number m corresponding to wedge position k and channel i from the precomputed position table.

$$I(m) = I(m) + \frac{\hat{x}_{ik}}{\hat{\sigma}_i}.$$

$$C(m) = C(m) + \frac{1}{\hat{\sigma}_i}.$$

5. For each m between 1 and M, $$I(m) = \frac{I(m)}{C(m)}$$

---

Mathematically, the image composed by use of the direct summation algorithm, Algorithm 1 set forth above, can be expressed by Equation (8). Specifying the $\delta_{ikm}$ in Equation (8) is equivalent to specifying the scanning pattern in the form exemplified above in the pixel position table. Thus, $\delta_{ikm}$ can be precomputed for $1 \leq i \leq N$, $1 \leq k \leq L$, and $1 \leq m \leq M$.

In contrast to Equation (8), the result of using the weighted summation image composition algorithm, Algorithm 2 set forth above, can be mathematically expressed in Equation (9).

The weighted summation image composition Equation (9), leads to the suppression and substantial elimination of undesired anomalous effects created by excessively noisy channels.

After having eliminated the effects of baseline signals, and upon using the flat fielding technique for channel normalization based on gain measurements obtained by hot and cold load calibration experiments, and upon weighting the contributions of each channel in the summation of the values for each pixel of the image in such a way that the contributions from the more noisy channels are diminished while the contributions from the less noisy channels are enhanced, the improved composition of the image 78 may proceed according to Algorithm 3 described below. Algorithm 3 illustrates the sequence of carrying out the steps of image formation in a radiometer based millimeter wave imaging camera. Algorithm 3 incorporates baseline subtraction, flat field normalizing, and channel weighting as described above.

---

Algorithm 3: Image Formation with Baseline Subtraction, Channel Weighting and Flat Fielding 1. Compute channel standard deviations $\sigma_i$, channel gains $g_i$, and the matrix $(A')_{inv}$ from calibration experiments channel observations.
   Compute the pixel position table. Compute the baseline signal $B_{ik}$, $1 \leq i \leq N$, $1 \leq k \leq L$.
2. Initialize the image array $I(m)$ to zero for $1 \leq m \leq M$.
3. Initialize an array of contribution counts $C(m)$ to zero for $1 \leq m \leq M$.
4. Subtract the baseline:
   For each wedge position k between 1 through L,
       For each channel number i between 1 through N,
           $x_{ik} = u_{ik} - B_{ik}$.
5. For each channel number i between 1 through N, Compute the channel mean: $\bar{x}_{ik} = \sum_{k=1}^{L} x_{ik}$.

6. For each wedge position k between 1 through L,
       For each channel number i between 1 through N,
           Look up the pixel number m corresponding to wedge position k and channel i from the precomputed position table.

$$I(m) = I(m) + \frac{x_{ik} - \bar{x}_i}{\hat{\sigma}_i}.$$

$$C(m) = C(m) + \frac{g_i}{\hat{\sigma}_i}.$$

7. For each channel number i between 1 through N,
   $b_i = 0$
       For each wedge position k between 1 through L,
           Look up the pixel number m corresponding to wedge position k and channel i from the precomputed position table.

$$b_i = b_i - \frac{I(m)}{C(m)}.$$

8. Compute the vector of channel-wise mean scan temperatures $$\begin{bmatrix} \theta_1 \\ \vdots \\ \theta_{N-1} \end{bmatrix} = (A')_{inv} \cdot \begin{bmatrix} b_1 \\ \vdots \\ b_N \end{bmatrix}, \text{ and } \theta_N = 0,$$

---

Algorithm 3: Image Formation with Baseline Subtraction, Channel Weighting and Flat Fielding 9. For each wedge position k between 1 through L,
       For each channel number i between 1 through N,
           Look up the pixel number m corresponding to wedge position k and channel i from the precomputed position table.

$$I(m) = I(m) + \frac{g_i}{\sigma_i} \theta_i.$$

10. For each m between 1 and M, $$I(m) = \frac{I(m)}{C(m)}$$

---

Figure 6:
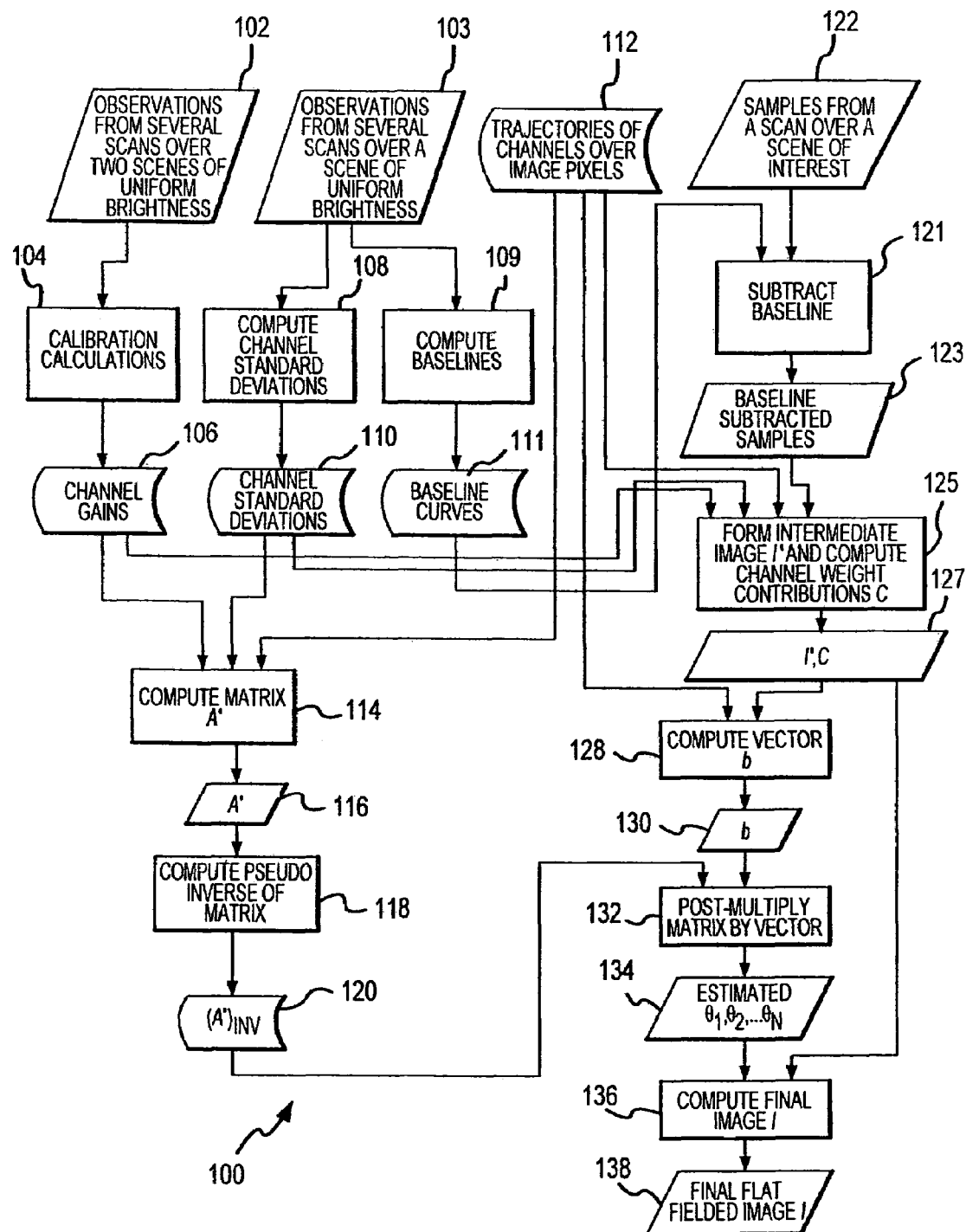
FIG. 6 is a flow chart of the actions and computations performed by the camera shown in FIG. 1 to compose an image in accordance with the methodology of various aspects of the present invention.

The flowchart shown in FIG. 6 describes a process flow 100 of actions, information and computations involved in obtaining and computing the enhanced image 78 using the improvements described above. A convention employed in the flowchart 100 is that those boxes having straight and perpendicular sides represent a computation, those boxes having slanted and non-perpendicular vertical sides represent data that is used once, and those boxes having curved vertical sides represent data that is used repeatedly, i.e. persistent data.

The process flow 100 begins at 102 where observations from several scans over two scenes of uniform brightness are collected. One of the two scenes of uniform brightness may be the background within an enclosure which has been air-conditioned to achieve a uniform temperature throughout. The second one of the two scenes of uniform brightness may be established by a black object inserted in the optical path 28. Scanning two scenes of different brightness temperatures establishes two different output value signals from each channel, and these two output value signals are used in calculating the gain of each channel. In addition or simultaneously at 103, further observations from scanning a scene of uniform brightness are also collected to establish a curve of the baseline signal described above.

The data obtained from the two scanning steps at 102 and 103 provides the necessary information needed to make the calibration calculations at 104, to calculate the standard deviations of the channel output value signals at 108, and to compute the baseline signal curves at 109. The calibrations at 104 result in establishing the values of the channel gains at 106. The standard deviations calculated at 108 proceed in accordance with conventional standard deviation calculation techniques and result in the standard deviation values for each channel at 110. The computation of the baseline at 109 results in the baseline curve information for each channel at 111.

At 112, the scanning paths or trajectories of each of the channels is obtained and correlated to the pixels 84 of the display 86 in the manner described above. Preferably, step 112 is accomplished by populating and using the pixel position look-up table described above which correlates the rotational position of the wedge shaped element 40 and the points 16 in the scene 14 and the pixels 84 in the image 78 (FIG. 1).

At 114, the matrix A' is calculated in the manner described above with respect to Equation (18), and the value of the matrix A' is established at 116. The pseudo-inverse of $(A')_{inv}$, is next computed at 118, preferably by using singular value decomposition as described above, and the pseudo-inverse result is stored at 120.

The steps 102–120 of the process flow 100 described above may be executed once and the data resulting from the computations thereafter stored for use repeatedly over a relatively large number of subsequent scans when imaging the scene 14. While it may not be necessary to do so, it may be advisable to repeat the initialization steps 102–120 periodically during the use of the millimeter wave imaging camera 10. The initialization steps 102–120 should be performed only after the elements of the millimeter wave imaging camera have warmed up and reached thermal equilibrium in an environment where use of the camera is likely to be continued, so the results from the steps will have the maximum value and accuracy.

The remaining steps 122–138 of the process flow 100 are performed during each scan to create a single image. Each time the image is updated, the steps 122–138 are preferably again performed. In this manner, the flat field normalizing factors obtained in accordance with the present invention will be applied to each image and each update of that image at the time that the image is created and updated. Consequently, effects of drift in the offset value will be immediately and effectively normalized and compensated with each scan.

At 122, the output value signals 70 or samples from a scan of the entire scene are collected as described above. At 121, the baseline values 111 are subtracted from the output value signals 70, resulting in the creation of baseline subtracted samples 123.

Using the baseline subtracted samples 123, the intermediate image I' is formed at 125 by applying the Equation (19), and the weighting contributions C are obtained by applying step 6 of Algorithm 3. The result of the computation at 125 is the value of the intermediate image I' and, weighting contributions C at 127.

The value of the intermediate image I' and the weighting C contributions established at 127 are used along with the information at 112 describing the scanning paths or trajectories of the channels in a computation of the vector b at 128. The computation at 128 occurs in accordance with Equations (15) and (16), and the value of the vector b is established at 130.

At 132, the stored pseudo-inverse of the matrix obtained from 120 is post-multiplied by the value of the vector b, obtained at 130. The computation at 132 results in the estimated values of the mean scan temperatures for each channel at 134. At 136, the final image l is computed using the mean scan temperatures obtained at 134, and the final flat fielded image is produced at 138.

The production of the final image at 138 obtains the numerous improvements described, thereby resulting in the creation of an image 78 having more contrast and resolution, or in the creation of an image having adequate contrast and resolution from radiated energy signals with less brightness temperature contrast. By performing the baseline subtraction before using the camera for imaging, and by performing the flat fielding and channel weighting with each scan 122, an improved image results under circumstances where the response characteristics of the channels can not otherwise be improved. Many other improvements and advantages will be apparent upon gaining a complete understanding of the present invention.

A presently preferred embodiment of the present invention and many of its improvements have been described with a degree of particularity. This description is a preferred example of implementing the invention, and is not necessarily intended to limit the scope of the invention. The scope of the invention is defined by the following claims.

What is claimed is:

1. A millimeter wave imaging method to compensate for variation in response to noise in at least one output signal from at least one channel, the method comprising:
   weighting at least one composition signal by a first weighting factor; and
   weighting at least one weighted composition signal by a second weighting factor.

2. The method of claim 1, wherein the noise is from at least one output signal of at least one channel.

3. The method of claim 2, wherein each weighted composition signal is related to an output signal.

4. The method of claim 2, wherein each output signal is from a channel and each channel scans radiant energy emanating from a scene.

5. The method of claim 4, further comprising:
   composing an image with a plurality of pixels, each pixel corresponding to a point in the scene;
   directing radiant energy emanating from each point in the scene into different channels; and
   composing an intensity of each pixel of the image from the weighted composition signals from each channel into which the radiant energy emanating from the corresponding point in the scene is directed.

6. The method of claim 5, further comprising:
   composing the intensity of each pixel by adding each weighted composition signal obtained from corresponding output signals.

7. The method of claim 6, further comprising:
   composing the intensity of each pixel from each weighted composition signal obtained from only the corresponding output signals of the channels into which the radiant energy emanating from the point in the scene corresponding to the pixel was directed.

8. The method of claim 7, further comprising:
   establishing a standard deviation for at least one output signal of each channel that derives the radiant energy emanating from the corresponding point relative to a mean of output signals; and
   creating at least one weighted composition signal for composing the intensity of each pixel by multiplying the at least one output signal by a reciprocal of the standard deviation corresponding to the at least one output signal.

9. The method of claim 6, further comprising:
   periodically updating the image created by obtaining new output signals from each channel; and
   creating each updated image from each weighted composition signal using weighting factors derived prior to updating the image.

10. The method of claim 6, further comprising:
    measuring the variation of the at least one output signal from a channel to establish the weighting factor for the channel in response to radiant energy from a scene of uniform brightness.

11. The method of claim 6, further comprising:
    directing the radiant energy emanating from each point in the scene to each channel with a movable scanning element.

12. The method of claim 6, further comprising:
    obtaining a magnitude of baseline signal components of each output signal from each channel at each position of a movable scanning element; and subtracting the magnitude of baseline signal components at each position of the movable scanning element from an output signal of a channel derived from the radiant energy directed into the channel from a scene of non-uniform brightness at corresponding positions of the movable scanning element.

13. The method of claim 12, further comprising:
measuring the magnitude of the baseline signal at each position from which radiant energy is directed into the channel from a scene of uniform brightness.

14. The method of claim 12, further comprising:
composing an intensity of each pixel from at least one baseline-compensated composition signal formed by subtracting the baseline signal from the output signal.

15. The method of claim 14, further comprising:
composing the intensity of each pixel by weighting each baseline-compensated composition signal by a weighting factor established from variations in the corresponding output signals of the channel from which the corresponding output signals were obtained.

16. The method of claim 15, further comprising:
composing the intensity of each pixel of the image by adding each weighted baseline-compensated composition signal from each channel into which the radiant energy emanating from the corresponding point in the scene is directed.

17. The method of claim 16, further comprising:
using as the weighting factor the reciprocal of the standard deviation of at least one output signal.

18. The method of claim 14, further comprising:
normalizing each weighted baseline-compensated composition signal from each channel on the basis of a flat fielding response of the channels.

19. The method of claim 18, further comprising:
normalizing each weighted baseline-compensated composition signal from each channel by a normalizing factor which is related to a gain of each channel and a drift in offset of each output signal from each channel.

20. The method of claim 19, further comprising:
calculating the normalizing factor from information defining the individual gain and offset characteristics of each channel.

21. The method of claim 20, further comprising:
calculating the normalizing factor based on a consistency condition that an unknown mean scan temperature encountered by each channel into which radiant energy from a portion of the scene is scanned is equal to an average of the intensities of those pixels to which the baseline-compensated composition signals contributes; and
calculating the average of pixel intensities based on an expression for the average pixel intensities in terms of the unknown mean scan temperature of each channel.

22. The method of claim 19, further comprising:
periodically updating the image created by obtaining new output signals from each channel;
creating each updated image from each normalized weighted baseline-compensated composition signal; and
calculating the normalizing factor with each scan of the radiant energy from the entire scene into each channel.

23. The method of claim 18, further comprising:
normalizing each weighted baseline-compensated composition signal from each channel on the basis that each channel observes a different mean scan brightness temperature from the radiant energy scanned from a portion of the scene than the mean brightness temperature of the entire scene.

24. The method of claim 2, further comprising:
measuring the variation of the at least one output signal from a channel to establish the weighting factor for the channel in response to radiant energy from a scene of uniform brightness.

25. The method of claim 1, further comprising:
establishing a standard deviation of variation of at least one output signal relative to a mean of output signals; and
creating at least one weighted composition signal by multiplying the at least one output signal by a reciprocal of the standard deviation corresponding to the at least one output signal.

26. The method of claim 25, further comprising:
composing an image by adding each weighted composition signal.

27. A detector camera, comprising:
a plurality of channels capable of scanning radiant energy emanating from one or more points in a scene and each channel is capable of converting the radiant energy into output signals; and
a processor capable of compensating for variation in response to noise in the output signals,
weighting at least one composition signals by a first weighting factor; and
weighting at least one weighted composition signal by a second weighting factor.

28. The camera of claim 27, wherein the plurality of channels receive the radiant energy from at least one of a movable scanning element and an optical element.

29. The camera of claim 27, wherein the processor forms output image signals on the basis of each weighted composition signals and the camera further comprises:
a display for providing an image formed on the basis of the output image signals.

30. The camera of claim 27, wherein the plurality of channels includes a focal plane array of channels.

31. The camera of claim 27, wherein the camera is utilized for one of passive imaging and active imaging.

32. The camera of claim 31, wherein each channel includes a radiometer channel when the camera is utilized in passive imaging.

33. The camera of claim 31, wherein each channel includes a receiver channel when the camera is utilized in active imaging.

34. The camera of claim 27, wherein each channel includes an antenna.

35. The camera of claim 34, wherein the antenna includes an endfire traveling wave slot antenna.

36. The camera of claim 27, wherein the camera includes a movable scanning element in the form of a wedge shaped refractive element which rotates about an axis.

37. The camera of claim 27, wherein the camera includes a movable scanning element in the form of a rotating mirror arranged in the optical path and retained at a non-orthogonal angle to its rotational axis.

38. The camera of claim 27, further comprising:
a movable scanning element; and
a position sensor connected to the movable scanning element, wherein the position sensor provides position signals to the processor;

wherein the position signals correspond to positions of the movable scanning element and wherein the processor uses the position signals for further determining the normalizing factor.

39. A system, comprising:

a processor;

a plurality of channels;

a computer-readable storing medium storing a set of instructions capable of being executed by the processor to implement a millimeter wave imaging method to compensate for variation in response to noise in image signals and capable of performing the steps of:

weighting at least one composition signal by a first weighting factor; and weighting at least one weighted composition signal by a second weighting factor.

40. A computer-readable storing medium storing a set of instructions capable of being executed by a processor to implement a millimeter wave imaging method to compensate for variation in response to noise in image signals and capable of performing the steps of:

weighting at least one composition signal by a first weighting factor; and weighting at least one weighted composition signal by a second weighting factor.

* * * * *